United States Patent [19]
Hecky

[11] Patent Number: 5,918,787
[45] Date of Patent: Jul. 6, 1999

[54] APPARATUS FOR FEEDING A WEB OF MATERIAL

[75] Inventor: Thomas Hecky, Weiden, Germany

[73] Assignee: BHS Corrugated Maschinen-und Anlagenbau GmbH, Weiherhammer, Germany

[21] Appl. No.: 08/831,702

[22] Filed: Apr. 10, 1997

[30] Foreign Application Priority Data

Apr. 12, 1996 [DE] Germany ............................ 196 14 519

[51] Int. Cl.⁶ ............................ B65H 23/16; B65H 23/18
[52] U.S. Cl. ............................ 226/34; 226/42; 226/172; 226/177
[58] Field of Search ............................ 226/24, 30, 31, 226/42, 171, 172, 176, 177, 34

[56] References Cited

U.S. PATENT DOCUMENTS

| | | | |
|---|---|---|---|
| 3,263,284 | 8/1966 | Orr et al. ............................ | 226/176 X |
| 4,119,256 | 10/1978 | Vogtmann et al. ...................... | 226/177 |
| 4,485,949 | 12/1984 | Gebhart et al. ............................ | 226/2 |
| 4,759,485 | 7/1988 | Braun et al. ............................ | 226/176 |
| 5,071,504 | 12/1991 | Singer ................................ | 226/177 X |
| 5,094,378 | 3/1992 | Aso et al. ............................... | 226/172 |
| 5,170,708 | 12/1992 | DiLalla .................................. | 226/30 X |
| 5,244,518 | 9/1993 | Krayenhagen et al. . | |

FOREIGN PATENT DOCUMENTS

| | | |
|---|---|---|
| 2201742 | 7/1973 | Germany . |
| 4212847 | 11/1993 | Germany . |
| 9518762 | 7/1995 | WIPO . |

Primary Examiner—Michael Mansen
Attorney, Agent, or Firm—Dennison, Meserole, Scheiner & Schultz

[57] ABSTRACT

Apparatus for feeding a web of material, in particular a web of cardboard, having at least one driven element which engages one surface of the web of material to be fed, and which cooperates with at least one bearing element acting upon the other surface of the web of material, a contact-pressure force for generating a frictional force exerted on the web of material, at least one bearing element or the at least one driven element is acted upon by a contact-pressure device, a sensor for detecting the feeding speed of the web of material which delivers to a control unit which operates to control the feeding speed signal of the contact-pressure device so that the difference between the detected web speed and a set-point speed signal applied to the control unit is essentially equal to zero.

13 Claims, 1 Drawing Sheet

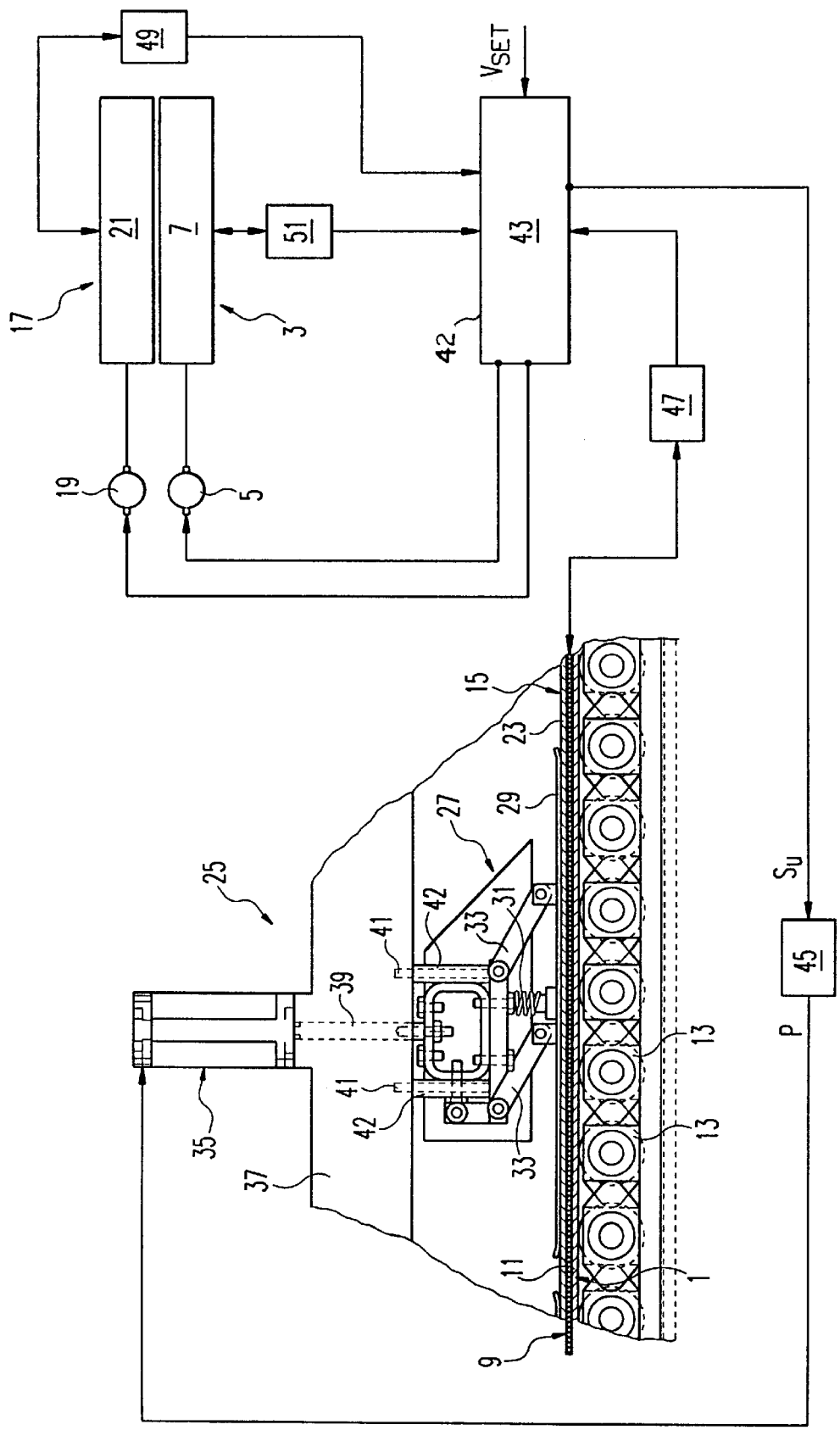

APPARATUS FOR FEEDING A WEB OF MATERIAL

The invention relates to an apparatus for feeding a web of material, in particular a web of cardboard.

BACKGROUND OF THE INVENTION

In the production of cardboard, two or more paper webs, at least one of which is corrugated in the course of the production process, are glued together. To that end, the individual paper webs to be processed and the finished cardboard as well must be transported at a predetermined speed through or inside the cardboard making system, which comprises a plurality of machines or processing stations disposed one after the other.

For transporting the webs, either separate feeding devices, so-called pull-off devices, which pull the affected web of material through one or more upstream processing stations or machines, or feeding devices that are integrated into an individual machine or processing station and that pull the web of material through the applicable machine or processing station and optionally also through one or more upstream machines or processing stations are used. Slip between the driving or pulling elements and the web of material must be avoided if at all possible, so that a constant feeding speed is assured, to avoid impairment of the web of material to be fed.

It is known, for instance from Published, Non-Examined German Patent Application DE-OS 22 01 742 to pull the web of cardboard through an upstream drying apparatus by means of a separate feeding device, which comprises endless upper and lower belts.

DE-OS 22 01 742 also discloses an integrated drying and transporting apparatus, in which the transport of the fully glued-together cardboard inside the drying and transporting apparatus is transported by means of one endless upper and one lower belt, and the drying of the web of cardboard is effected by suction of an air stream through the interior of the cardboard, crosswise to the travel direction of the web of cardboard. Because of the resultant negative pressure in the interior of the cardboard, high frictional adhesion also results between the cardboard to be transported and the upper or lower belt. As a result, it is attained that there is only slight play between the belts and the respective surfaces of the web of cardboard.

However, this method for avoiding undesirably high slip between the cardboard to be transported and the endless belt is restricted to this special drying apparatus. In particular, this method cannot be employed in a transporting apparatus for a smooth paper web.

From German Patent Disclosure DE 42 12 847 A1, a heating device for a cardboard-making system with an integrated feeding apparatus is also known, in which the heater comprises heating places by way of which the web of cardboard that is to be dried is fed by means of an endless belt. Above the lower run of the endless belt, which is the run that feeds the web of cardboard, one or more contact-pressure devices are arranged, which pressure the lower run of the endless belt against the top of the web of cardboard. These contact-pressure devices may for instance be embodied as pressure rollers or pressure hoods that can be raised and lowered. The amount of pressure for pressing the run of the endless belt against the top of the web of cardboard, must be dimensioned such that the frictional adhesion of the endless belt relative to the web of cardboard is always greater than the sliding friction between the web of cardboard and the heating surface or surfaces.

For controlling the quantity of heat transferred to the web of cardboard, it is known from DE 42 12 847 A1 to measure the temperature or moisture content of the arriving web of cardboard or the departing web of cardboard and to control the pressure values of the contact-pressure device as a function of the measured temperature or moisture values. A disadvantage of all these known apparatuses, however, is that slip between the web of material to be fed and the elements that feed the web of material cannot be avoided in every situation. Especially when there are changes in process parameters (such as temperature, travel speed of the web of material, etc.), changes in parameters of the web of material (such as width, thickness, surface property, etc.), or during the startup and shutdown phase of the machine, or in other words under positive or negative acceleration, it is impossible with adequate certainty to avoid slip in the known feeding apparatuses. Especially when the cardboard-making system is converted to produce other web widths, different types of cardboard, or for processing different qualities of starting materials, currently no resetting of the transport apparatuses is performed.

OBJECTS OF THE INVENTION

It is the object of the present invention to create an apparatus for feeding a web of material, in particular a web of cardboard, in which slip between the driving element or elements and the web of material is reliably avoided even if process parameters and/or parameters of the web of material to be fed change.

SUMMARY OF THE INVENTION

The invention comprises an apparatus for feeding a web of material, in particular a web of cardboard, having at least one driven element which engages one surface of the web of material to be fed, and which cooperates with at least one bearing element acting upon the other surface of the web of material, a contact-pressure force to generate a frictional force on the web of material, a bearing element or a driven element acted upon by a controllable contact-pressure device and a sensor for detecting the feeding speed of the web of material, the sensor signal being delivered to a control unit which regulates the contact-pressure device so that the difference between the detected web speed and the set-point speed is substantially equal to zero.

Because the speed of the web of material is detected, it is possible for the control unit of the feeder apparatus according to the invention to adjust the contact-pressure device with regard to the contact-pressure force exerted in such a way that no slip occurs between the web of material and the at least one driven element. To that end, the difference between the set-point value of the web speed, which is known to the control unit and which corresponds to the set-point value of the drive speed of the at least one driven element, and the detected actual value of the web speed is formed, and the compressive force is increased at least to the extent that the difference is equal to zero or is below a predetermined allowable value.

In the preferred embodiment of the invention, the control unit adjusts the contact-pressure device in such a way that the contact-pressure force is essentially equivalent to the minimum contact-pressure force, which is required at which a slip equal to zero or an allowable slip results.

Particularly in the use of contact-pressure elements with pressure shoes or other elements inside the feeding apparatus, in which sliding friction occurs, this offers the advantage of a minimum requisite driving power.

In a preferred embodiment of the invention, a further sensor for detecting the actual speed of the at least one driven element is provided. This offers the advantage that the actual speed of the at least one driven element is actually detectable and cannot deviate from a predetermined setpoint speed for the drive mechanism. In this way, the advantage is attained that drives of simple construction, such as those with asynchronous electric motors, can be used as the drive mechanisms, since the sensor signal is simultaneously usable as a closed-loop control parameter for keeping the drive speed constant. It is understood that this closed-loop control can also be performed by the control unit.

In the preferred embodiment of the invention, the at least one bearing element also includes a driven element. As a result the advantage is attained that the web of material to be transported is driven on both surfaces. Thus particularly when a freshly glued web of cardboard is being transported, displacement of the individual parts of the web relative to one another is avoided. This reliably avoids impairment of the web of material to be transported.

In the preferred embodiment of the invention, the at least one driven element is a driven endless belt, especially as a lower belt.

The actual speed of the driven element of the bearing element can be detected by means of a further sensor, and the sensor signal can again be used for closed-loop control of the drive speed of this element.

In the preferred embodiment of the invention, the control unit regulates the drive speed of the at least one driven element and the drive speed of the driven element of the at least one bearing element in such a way that each of these elements drives the respective surface of the web of material at the same speed.

Along with the control of the contact-pressure force that can be generated by the contact-pressure element, on the one hand the web speed is therefore prevented from being below the lower of the two drive speeds of the driven elements, and on the other hand, it is attained that the two drive speeds of the driven elements on the top and bottom sides of the web of material to be fed are substantially equal, or in other words that the difference between the two speeds is equal to zero or is below an allowable threshold value.

Further features of the invention will become apparent from the dependent claims.

BRIEF DESCRIPTION OF THE DRAWING

The FIGURE is a schematic illustration of a portion of a feeding apparatus and the associated controller of the apparatus.

DETAILED DESCRIPTION OF THE INVENTION

The portion of a transport apparatus shown in the drawing includes a lower belt 1, which is embodied in the usual way as an endless belt and is guided around at least two deflection rollers, not shown, of which at least one is driven by means of an electric-motor drive 3. The electric-motor drive 3 shown only schematically in the drawing includes an electric motor 5, which is operatively connected to at least one of the deflection rollers via an intervening gear 7. The run 11 of the lower belt that is essential for the transporting of a web of material 9 to be fed is guided over a series of rollers 13, which serve to support the run 1 and to avoid sagging of the run 11 such as a force counteracting the contact-pressure force. The top side of the run 11 of the lower belt 1 engages the bottom side of the web of material 9 and together with the upper belt 15, which is driven in the same way, accomplishes the transporting of the web of material 9 in the direction of the arrow as shown.

The upper belt 15 is also embodied in a known manner as an endless belt, which is guided via at least two deflection rollers, not shown. Once again, at least one of the deflection rollers is driven by means of an electric-motor drive 17. The electric-motor drive 17 comprises an electric motor 19 and a gear 21.

One run 23 of the upper belt 15 acts upon the top of the web of material 9 to be fed. To avoid slip between the web of material 9 and the runs 11 and 23 of the lower belt 1 and upper belt 15, respectively, a contact-pressure device 25 is provided, which includes a pressure shoe 27 that can be displaced crosswise to the feeding direction of the web of material 9 and can be acted upon by a compressive force.

The pressure shoe 27, with its pressure plate 29, acts upon the top side of the run 23 of the upper belt 15. The pressure plate 29 is disposed so as to be pivotable on the pressure shoe counter to the force of a spring 31, so that upon a displacement of the pressure shoe 27, a deflection of the pivotable levers 33 and hence a change in the compressive force exerted by the pressure plate 29 on the run 23 is effected.

The displacement drive for the pressure shoe 27 is made possible by means of a pneumatically or hydraulically controlled piston-cylinder unit 35. This unit is secured to a stationary frame part 37 of the transport apparatus. The piston 39 of the piston-cylinder unit 35 is coupled to the pressure shoe 27, which is additionally guided in the direction of the displacement motion by means of bolts 41, which are provided in the frame part 37 and engage bushes 43 in the pressure shoe 27.

The displacement travel of the piston-cylinder unit 35 is dimensioned such that in an extreme case, the pressure plate 29 of the pressure shoe 27 can be lifted completely away from the top side of the run 23. It is understood that in that case the swiveling travel of the levers 33 or the spring travel of the spring must be limited by a stop.

To generate a predetermined normal force with which the run 23 of the upper belt 15 is to be acted upon by the pressure plate 29 of the pressure shoe 27, or to generate a predetermined pressure per unit of surface area, the piston-cylinder unit 35 is embodied as adjustable by a control unit 42. To that end, the control unit 42 outputs a control signal $S_U$, for instance a control voltage, which is converted by a converter unit 45 into a physical variable for generating a corresponding displacement travel by means of the piston-cylinder unit 35, this variable for instance being a particular control pressure P. The control pressure P is delivered in a suitable way to the piston-cylinder unit 35 so as to accomplish a displacement of the pressure shoe 27 in the desired direction and thus to increase or decrease the normal force exerted on the run.

As shown in the drawing, a first sensor 47 for detecting the actual feeding speed of the web of material 9 is provided, whose sensor signal is delivered to the control unit 42. The signal of the sensor 47 is evaluated by the control unit 42 in such a way that it is compared with the drive speed of the upper belt and/or the drive speed of the lower belt 1. The difference found can then be compensated for, so that between the web of material 9 and the run 23 of the upper belt 15, or the run 11 of the lower belt 1, is reliably avoided.

This naturally requires that the speed of the upper belt 15 or lower belt 1 be known to the control unit 43. This can be accomplished on the one hand by providing that the speed signal output by the control unit 42 to the electric motors 5 and 19 of the electric-motor drives 3 and 17, respectively, is used as the set-point value. However, that leads to adequate results only if the electric motors 5 and 19 are arranged such that they react in every case, with a precisely defined, suitable drive speed, to the applicable signal output by the control unit 42. It is understood that each of the gears 7 and 21 including the transfer of force to the lower belt 1 or the upper belt 15, must also be without any slip whatever, so that the control of the electric motors 5 and 19 by means of the signal output by the control unit 42 leads precisely to the desired set-point value for the drive speed of the runs 11 and 23, respectively.

Since this involves a corresponding amount of effort and expense and moreover the desired outcome cannot be attained in every case in this way, the apparatus according to the invention, as shown in the drawing, includes a second sensor 49 and a third sensor 51 for detecting the drive speeds of the upper belt 15 and lower belt 1. The sensors may be coupled with the gears 21 and 7, as shown, or may detect the speed of the upper belt and lower belt, respectively, directly. It is also conceivable to couple them to the respective motors 19 and 5.

The sensors 49 and 51 offer the advantage that the control unit 42, by an evaluation of each of the sensor signals, can regulate the drive speed of the respective upper belt 15 or lower belt 1 in the form of a closed control loop. As a result, exact synchronism of the upper belt 15 with the lower belt 1 can be attained, so that any impairment to the web of material 9 to be fed that might be caused by different drive speeds can be reliably avoided. In addition, this naturally also makes it possible to adhere precisely to a specified set-point speed.

The closed-loop control is preferably effected in such a way that a set-point speed value $v_{set}$ is delivered to the control unit 42 or stored in memory in the control unit, this value corresponding to the desired feeding speed for the web of material. As a function of the signals of the sensors 49 and 51, the control unit 42 generates controlled variables for the respective electric motors 19 and 5 such that the actual speed detected by the sensors deviates not at all or only by an allowable slight amount from the set-point value $v_{set}$.

Moreover, as already described above, the control unit 42 evaluates the signal of the sensor 47 for detecting the feeding speed of the web of material 9 and regulates the normal force exerted on the run 23 of the upper belt 15 by the pressure shoe 27 in such a way that the deviation of the ascertained actual speed of the web of material 9 deviates not at all or only by an allowable slight value from the set-point speed $v_{set}$.

In this way it is assured that even if production parameters change, examples being the variation in the feeding speed, temperature changes, etc., or upon changes in parameters of the web of material to be fed, for instance if there is a change in thickness of the web of material, in the paper properties, in the width of the web of material, etc., the desired feeding speed will be maintained in each case and no impairment whatever of the web of material being fed will occur.

For the sake of the lowest possible driving power, the regulation of the contact-pressure force is done precisely such that there is still no slip; that is, only the minimum requisite contact-pressure force is exerted, and the friction losses are thus minimized.

It is understood that the fundamental principle of the present invention is not limited to the exemplary embodiment described. For instance, instead of a pressure shoe, a device which generates compressed air, or one or more contact-pressure rollers, may be used. In the same way, in the simplest case the lower belt can be omitted entirely, and instead of it a sliding motion of the web of material 9 can be effected along a bearing surface. This latter option is especially suitable for the case where the feeding apparatus according to the invention is to be integrated into a dryer or heater device.

It is also possible in the apparatus described for only the driving speed of one of the belts, for instance, to be ascertained by means of a suitable sensor, in order to perform compensation for any slip that might occur between the web of material and the applicable belt.

I claim:

1. Apparatus for feeding a web of material comprising:
   at least one driven element (15) which engages a first surface of the web of material;
   at least one bearing element acting upon a second surface of the web of material;
   means to generate a contact-pressure force (25) to produce a frictional force between the web of material and the driven element to cause the web of material to move at a feeding speed;
   a control unit (42);
   a sensor (47) for generating a signal corresponding to the feeding speed of the web of material, said sensor signal being delivered to the control unit;
   and said control unit adjusting the contact-pressure means (25) so that the difference between a set point speed signal and the feeding speed signal is substantially equal to zero.

2. The apparatus of claim 1, wherein the set-point speed signal is applied to the control unit.

3. The apparatus of claim 1, wherein the set-point speed signal is stored in a control unit memory.

4. The apparatus of claim 1, wherein the control unit (42) operates the contact-pressure means so that a contact-pressure force is produced which is only sufficient to avoid slip between the web of material and the driven element.

5. The apparatus of claim 1 including a second sensor (49) for detecting the actual speed of the at least one driven element (15) and said second sensor generating an actual speed signal which is delivered to the control unit (42).

6. The apparatus of claim 1, wherein the at least one driven element (15) is a driven endless belt.

7. The apparatus of claim 6 wherein the contact-pressure device (25) includes a pressure shoe (27), which acts upon the endless belt (15).

8. The apparatus of claim 6, wherein the contact-pressure device (25) includes a controllable pneumatic piston-cylinder unit (35).

9. The apparatus of claim 6, wherein the contact pressure device (25) includes a controllable hydraulic piston-cylinder unit (35).

10. The apparatus of claim 1, wherein the at least one bearing element (1, 13) includes a driven element (1).

11. The apparatus of claim 10, wherein at least one third sensor (51) for detecting the actual speed of the driven element (1) of the bearing element (1, 13) is provided, whose signal is delivered to the control unit (42).

12. The apparatus of claim 11, wherein the control unit 42 regulates the drive speed of the at least one driven element (15) and the drive speed of the driven element (1) of the at least one bearing element (1, 13) in such a way that each of these elements drives the respective surface of the web of material (9) at essentially the same speed.

13. The apparatus of claim 1, wherein the at least one bearing element (1) includes an endless belt and a plurality of contact-pressure rollers.

* * * * *